C. F. FISK.
REVERSIBLE TIRE TREAD.
APPLICATION FILED FEB. 8, 1912.
1,070,440.
Patented Aug. 19, 1913.
2 SHEETS—SHEET 1.
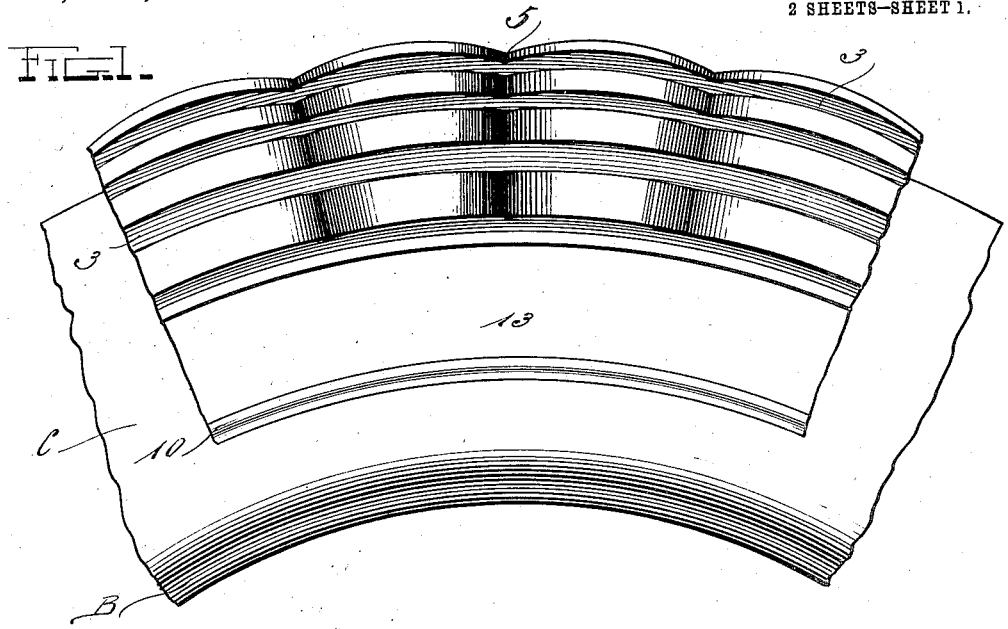
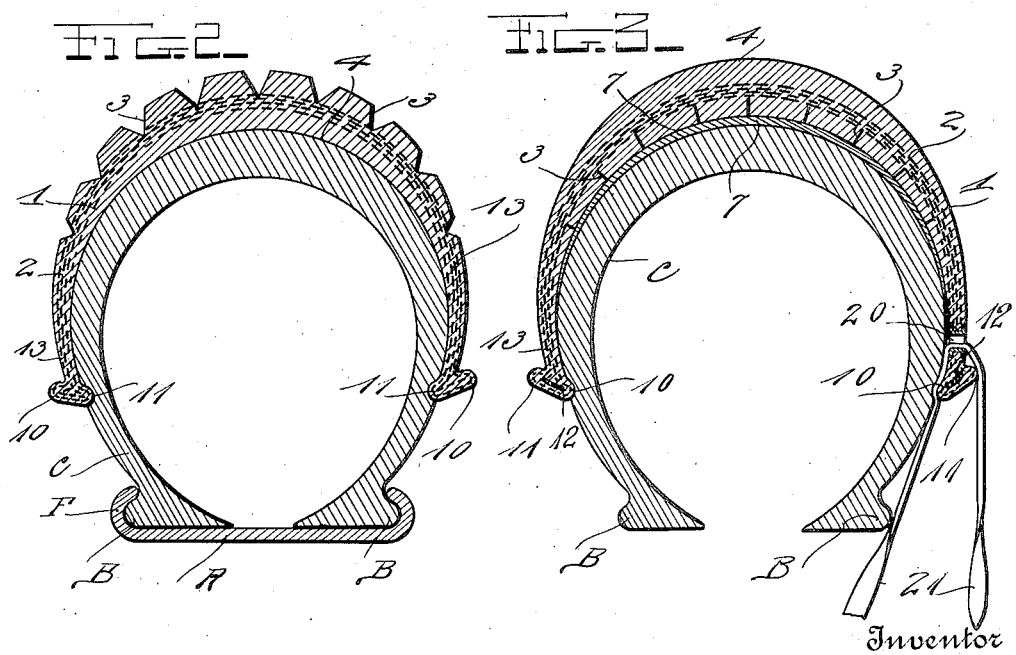
Witnesses
J. R. Pierce
N. L. Collamer
Inventor
C. F. Fisk
by H. B. Willson & Co.
Attorneys

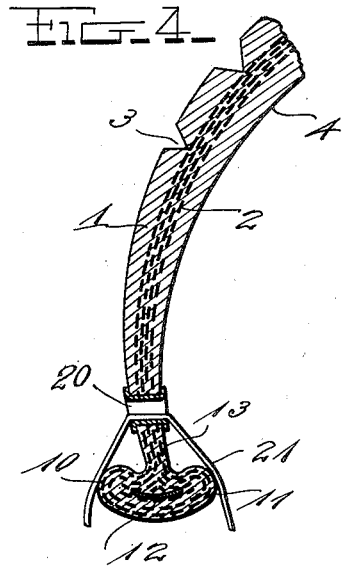
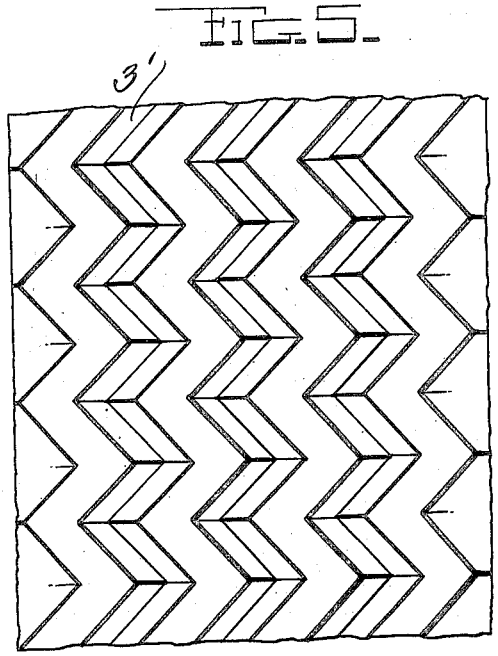
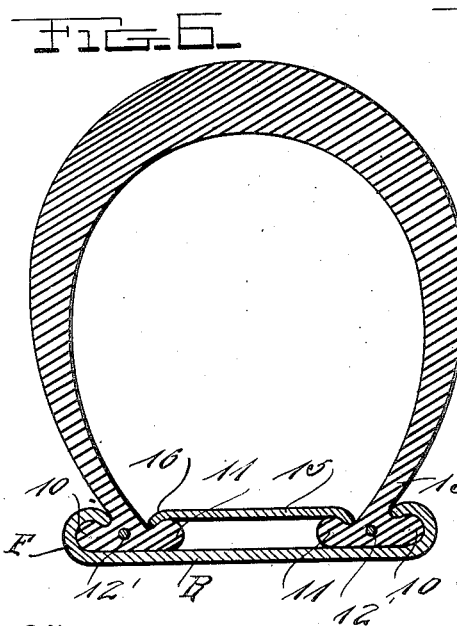
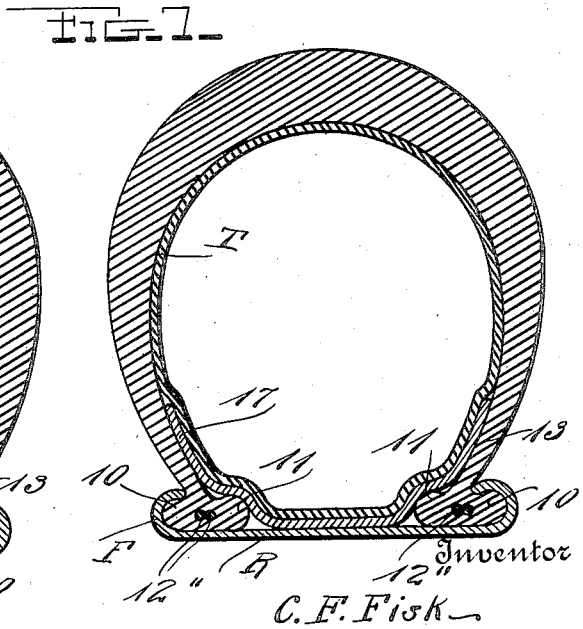

UNITED STATES PATENT OFFICE.

CLARK FRANCIS FISK, OF ALLENTOWN, NEW JERSEY.

REVERSIBLE TIRE-TREAD.

1,070,440.   Specification of Letters Patent.   Patented Aug. 19, 1913.

Application filed February 8, 1912. Serial No. 676,211.

*To all whom it may concern:*

Be it known that I, CLARK FRANCIS FISK, a citizen of the United States, residing at Allentown, in the county of Monmouth and State of New Jersey, have invented certain new and useful Improvements in Reversible Tire-Treads; and I do declare the following to be a full, clear, and exact description of the invention, such as will enable others skilled in the art to which it appertains to make and use the same.

This invention relates to resilient tires, and more especially to those of the pneumatic type; and the object of the same is to produce an improved tread having means for holding it automatically upon the shoe or casing and possessing the possibility of being reversed in position thereon.

To this end the invention consists in the construction of such a tread which, if amplified in its transverse dimensions, may in fact be used as or in the place of the shoe or casing.

Details of the construction of this invention are set forth in the following specification and claims, and illustrated in the drawings wherein—

Figure 1 is a side elevation of a portion of this improved tread applied to a shoe or casing of the ordinary type. Fig. 2 is a cross section of the same with the tread in position to expose its roughened or anti-skid surface, and Fig. 3 is a similar section with the tread reversed in position to expose its smooth surface. Fig. 4 is an enlarged sectional detail of one edge of the tread itself, more especially showing the construction of its bead. Fig. 5 is a plan view of a portion of the anti-skid surface with the grooves therein of slightly different shape from those elsewhere illustrated. Fig. 6 is a cross section through my improvement when amplified to such an extent that the tread itself may be used as the shoe or casing, and Fig. 7 is a similar section with the pneumatic tube inclosed therein and a flexible strip interposed between it and the rim.

In the drawings the letter C has been used to indicate the ordinary shoe or casing of a pneumatic tire, the same preferably having beads B along its edges by which it is secured under the flanges F of a rim R as usual in tires of the clencher type, and the letter T designates the pneumatic tube which is to be inflated within the casing in the customary manner. It is well known that the radially outer surface of the casing is most subjected to injury and wear, and it is the purpose of the present invention to provide a sheath or tread applicable to new or to old tires so as to lengthen their life, the tread itself having two faces whereof one is by preference made rough or anti-skid in character and the other smooth so that the user may apply it either face out or may reverse it after one face has become worn.

I may here say that while the tread portion is by preference composed of rubber with embedded thicknesses of friction canvas or duck, its specific construction and size and other details form no essential features of the present invention further than as described below.

Referring now to Fig. 4, this improved tread is shown as made of rubber indicated at 1, with a plurality of sheets or thicknesses of friction canvas, duck, or the like embedded therein as indicated at 2 when the tread is manufactured, and one face of said tread is made with longitudinal grooves 3 to render it anti-skid in character, while the other face 4 is made plain. The grooved surface of the tread may, if desired, be also provided with undulations or ribs extending transversely as indicated at 5 in Fig. 1, but these form no part of the present invention and will not be again referred to.

When this improved tread is applied with the smooth face 4 inward as seen in Fig. 2, the grooves 3 open as the anti-skid surface is exposed for contact with the earth, but when the tread is reversed as seen in Fig. 3 the grooves 3 close up as therein indicated and the smooth face 4 is exposed for contact with the earth. If it should so happen that the user applies the device to his tire first as seen in Fig. 2 and uses it for a time in that position, and after the anti-skid surface becomes worn he desires to reverse it to the position shown in Fig. 3, it will be necessary for him to insert a filler 7 between the shoe or casing C and the then inner face of the tread, the obvious reason being because the thickness of the tread has been reduced by wear. Grooves which are zig-zag or undulating but nevertheless have a general direction which is longitudinal of the tire, as seen at 3′ in Fig.

5, may be substituted for the straight grooves 3 shown in Figs. 4 and 1; but in any event I prefer that the grooves shall be V-shaped so that when the tread is reversed as seen in Fig. 3 their walls will close up.

Another feature of the present invention lies in the specific form of bead employed in connection with a tread of this character. In Fig. 4 the bead is shown as composed of an integral portion of the rubber body 1 and an extension of the strips 2, but its important feature of construction is that it has lobes 10 and 11 projecting to both sides of the body of the tread, instead of to one side thereof so as to produce a single bead as indicated at B in Fig. 3, and the strips 2 are continued out into both lobes. The fact that the two lobes of the bead contain so much canvas may be sufficient to render them quite hard and stiff, but in addition I preferably insert a ring composed of a metal strip 12 as indicated in Fig. 4, a single wire 12′ as shown in Fig. 6, or a twisted or multi-strand wire 12″ as shown in Fig. 7. The bead as a whole is connected with the tread by a rather narrow neck 13 capable of flexing as described below. A bead so made possesses considerable thickness, and with its neck it constitutes a substantially T-shaped edging for the tread. When the tread is applied to a casing C as indicated in Figs. 2 and 3, the tire is of course deflated and rather soft, and as the tire is subsequently inflated and the casing grows larger toward its outer portion (its inner portion being retained under the flanges F of the rim R as seen in Fig. 2) the inner lobes 11 are bent downward or inward toward the rim and the outer lobes 10 are therefore canted upward or outward slightly, the entire bead flexing on a line along its neck 13. When the tire is completely inflated the outside lobes 10 will have been canted up or out to a considerable extent as shown, and the inside lobes 11 will have been indented into the outer surface of the casing C so that the tread is automatically gripped thereon and will not become dislodged therefrom. If, however, the tire is deflated purposely or accidentally, the casing C no longer engages the innermost lobe, and the tread may then be removed. On racing cars or those used by timid drivers who fear the possibility that the treads will automatically and accidentally run off the shoe in case the tire should go flat while the car is moving, it may be wise to provide the tread with eyelets 20 through or just outside the neck 13, and lace it to the rim and felly by means of bands or straps 21 engaging these eyelets but having sufficient flexibility to permit the indentation of the casing by the inner lobe as described above. This possibility is illustrated in Fig. 3.

An amplification of my general idea is shown in Figs. 6 and 7 where substantially the same bead is employed along both edges of the tread, but the latter is made wider and probably heavier so as to itself constitute a casing within which may be disposed a pneumatic tube T as shown; and even when my improved tread is amplified so that it is adapted to this greater field of usefulness, it retains its reversible qualities as described above and either or neither face or both faces may be made anti-skid if desired. In this use of my device I provide either a pressed or rolled steel, or other metal band or strip 15 to be located within the tread (which we might now call a case), the strip having slightly downturned edges 16 to engage behind the inner lobes 11, although the inner lobes become the outer lobes when the case is reversed, as will be clear; and in some cases a strip of friction canvas or duck 17 may be cured to, vulcanized with, or cemented upon the tube T along its inner side so as to overlie the inner lobes 11 and prevent the tube from being cut or injured by any other part, in a manner well known. It will not be necessary to show holes through the band 15, strip 17, and rim R, but of course the inner tube T must have a nipple at one point adapted to pass through said holes and by which the tire may be inflated. When my improvement is amplified to this extent, the lobes of its beads respectively engage under the flanges F and the tube T, or under whatever member is interposed between the inner lobes and said tube, and the lobes again rock a little on the neck 13 so that as the tube is inflated and the tire grows in size this improved bead assumes the position shown in Figs. 6 and 7.

It is quite possible that the tread forming the subject matter of the present invention could be used for a considerable time as the casing of a tire inclosing a tube of rather small size, and then be removed and used as a tread on the much worn casing of a tire of larger size, and in this way the device would be used twice. Or possibly it could be used first as the tread on a large sized tire and then later as the casing of a small sized tire. In either use of the device it could be employed with either face out, according to whether the user desired a rough or a smooth tread surface or whether one face or the other of the device had become much worn. Thus it will be seen that the possibilities of this invention are considerable, and I lay claim to all the uses to which it may be put and the advantages arising therefrom without limiting myself to the specific details of construction further than as set forth in the following claims.

I claim—

1. A device of the class described comprising a reversible body made thick along its center and thinner toward each edge so as to produce a neck, an integral bead beyond each neck and having lobes projecting laterally to both sides, one face of the thicker portion of the body being provided with V-shaped grooves of a width to close when this face is disposed inward, and a filler adapted to be interposed between this device and the tire case to which it is applied when the former has become worn and is reversed, substantially as described.

2. A device of the class described comprising a body made thick along its center and thinner toward each edge so as to produce a neck, eyelets through said necks, an integral bead beyond each neck and having lobes projecting laterally to both sides; and stiffening devices within said bead; combined with a lacing engaging said eyelets and adapted to inclose said bead and be connected with the wheel, for the purpose set forth.

In testimony whereof I have hereunto set my hand in presence of two subscribing witnesses.

CLARK FRANCIS FISK.

Witnesses:
Wm. C. Smith,
J. Harold Smith.